United States Patent
Chu et al.

(10) Patent No.: US 11,606,052 B2
(45) Date of Patent: Mar. 14, 2023

(54) CURRENT STATE DETERMINATION METHOD AND CIRCUIT

(71) Applicant: Sentelic Corporation, Taipei (TW)

(72) Inventors: Lin Abel Chu, Taipei (TW); Wen-Ting Lee, Taipei (TW)

(73) Assignee: Sentelic Corporation, Taipei (TW)

( * ) Notice: Subject to any disclaimer, the term of this patent is extended or adjusted under 35 U.S.C. 154(b) by 60 days.

(21) Appl. No.: 17/244,961

(22) Filed: Apr. 30, 2021

(65) Prior Publication Data
US 2022/0181996 A1   Jun. 9, 2022

(30) Foreign Application Priority Data

Dec. 4, 2020   (TW) ................................ 10914280.1

(51) Int. Cl.
*H02P 8/12*   (2006.01)
*H02P 8/22*   (2006.01)

(52) U.S. Cl.
CPC . *H02P 8/12* (2013.01); *H02P 8/22* (2013.01)

(58) Field of Classification Search
CPC ..................................... H02P 8/12; H02P 8/22
See application file for complete search history.

(56) References Cited

U.S. PATENT DOCUMENTS

| | | | |
|---|---|---|---|
| 10,084,402 B2 | 9/2018 | Saw et al. | |
| 2011/0062910 A1* | 3/2011 | Tsai | H02P 6/18 318/400.35 |
| 2012/0223667 A1* | 9/2012 | Wang | H02M 3/1588 323/311 |
| 2013/0300329 A1* | 11/2013 | Jeske | H02P 6/182 318/400.34 |
| 2015/0349673 A1* | 12/2015 | Wu | H02P 23/14 318/779 |

FOREIGN PATENT DOCUMENTS

| | | |
|---|---|---|
| TW | 201705419 A | 2/2017 |
| TW | 201823751 A | 7/2018 |
| TW | I649958 B | 2/2019 |

* cited by examiner

*Primary Examiner* — Rina I Duda
(74) *Attorney, Agent, or Firm* — CKC & Partners Co., LLC (57) ABSTRACT

A current state determination method is configured to determine a state of current passing through a coil of a motor and includes: at a first time point when a high side transistor and a low side transistor are switched to a cut-off state, measuring a voltage of a node where the high side transistor, the low side transistor and the coil are coupled, so as to output a first voltage; at a second time point when the high side transistor and the low side transistor are maintained in the cut-off state, measuring the voltage of the node, so as to output a second voltage; comparing the first voltage and the second voltage to obtain a comparison result; and determining the state of the current according to the comparison result. The present disclosure also provides a current state determination circuit for performing the current state determination method.

17 Claims, 9 Drawing Sheets

CURRENT STATE DETERMINATION METHOD AND CIRCUIT

CROSS-REFERENCE TO RELATED APPLICATION

This application claims priority to Taiwan Application Serial Number 109142801, filed Dec. 4, 2020, which is herein incorporated by reference in its entirety.

BACKGROUND

Field of Invention

This disclosure relates to the current state determination method and circuit, and in particular to the current state determination method and circuit for determining the state of coil current.

Description of Related Art

In the example of one group of the high side transistor and the low side transistor of the driving circuit of three-phase motor, the high side transistor and the low side transistor would be alternatively turned on to change the direction of coil current, so as to drive motor. When the motor is driven, there is a period (hereafter referred to as the dead zone) that the high side transistor and the low side transistor would both be in the cut-off state (be turned off). It is worth noting that the direction of coil current when in the dead zone can accurately reflect the instant state of motor in operation. Also, the voltage of a node where the high side transistor, the low side transistor and the coil are coupled would be changed according to the direction of coil current when in the dead zone. Accordingly, the voltage of the node is conventionally compared with the system high voltage or the system low voltage for determining the direction of coil current when in the dead zone, and then the instant information of the motor in operation would be obtained.

However, the result of determination described above can be easily affected by the system noise. The auxiliary circuit (or other special approaches) is usually required in order to measure the voltage higher than the system high voltage (or the voltage lower than the system low voltage), so as to cause the increase in cost. Furthermore, when the voltage of the node is between the system high voltage and the system low voltage, the direction of coil current usually cannot be determined.

SUMMARY

An aspect of present disclosure relates to a current state determination method. The current state determination method is configured to determine a state of current passing through a coil of a motor and includes: at a first time point when a high side transistor and a low side transistor are switched to a cut-off state, measuring a voltage of a node where the high side transistor, the low side transistor and the coil are coupled, so as to output a first voltage; at a second time point when the high side transistor and the low side transistor are maintained in the cut-off state, measuring the voltage of the node, so as to output a second voltage; comparing the first voltage and the second voltage to obtain a comparison result; and determining the state of the current according to the comparison result.

Another aspect of present disclosure relates to a current state determination method. The current state determination method is configured to determine a state of current passing through a coil of a motor and includes: at a first time point when a high side transistor and a low side transistor are switched to a cut-off state, starting to time; at a second time point when the high side transistor and the low side transistor are maintained in the cut-off state, measuring a voltage of a node where the high side transistor, the low side transistor and the coil are coupled, so as to output a voltage; comparing the voltage with a threshold value to obtain a comparison result; and determining the state of the current according to the comparison result.

Another aspect of present disclosure relates to a current state determination circuit. The current state determination circuit is configured to determine a state of current passing through a coil of a motor and includes a voltage measurement unit and a processing unit. The voltage measurement unit is coupled to a node and is configured to measure a voltage of the node, wherein a high side transistor, a low side transistor and the coil are coupled to the node. The processing unit is coupled to the voltage measurement unit and is configured to determine the state of the current when the high side transistor and the low side transistor are in a cut-off state according to a voltage change of the node.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "first", "second", etc. used in this specification do not specifically refer to order or sequence, nor are they intended to limit this disclosure. They are only used to distinguish the components or operations described in the same technical terms.

In addition, the terms "coupled" or "connected" as used herein may mean that two or more elements are directly in physical or electrical contact, or are indirectly in physical or electrical contact with each other. It can also mean that two or more elements interact with each other.

Figure 1:
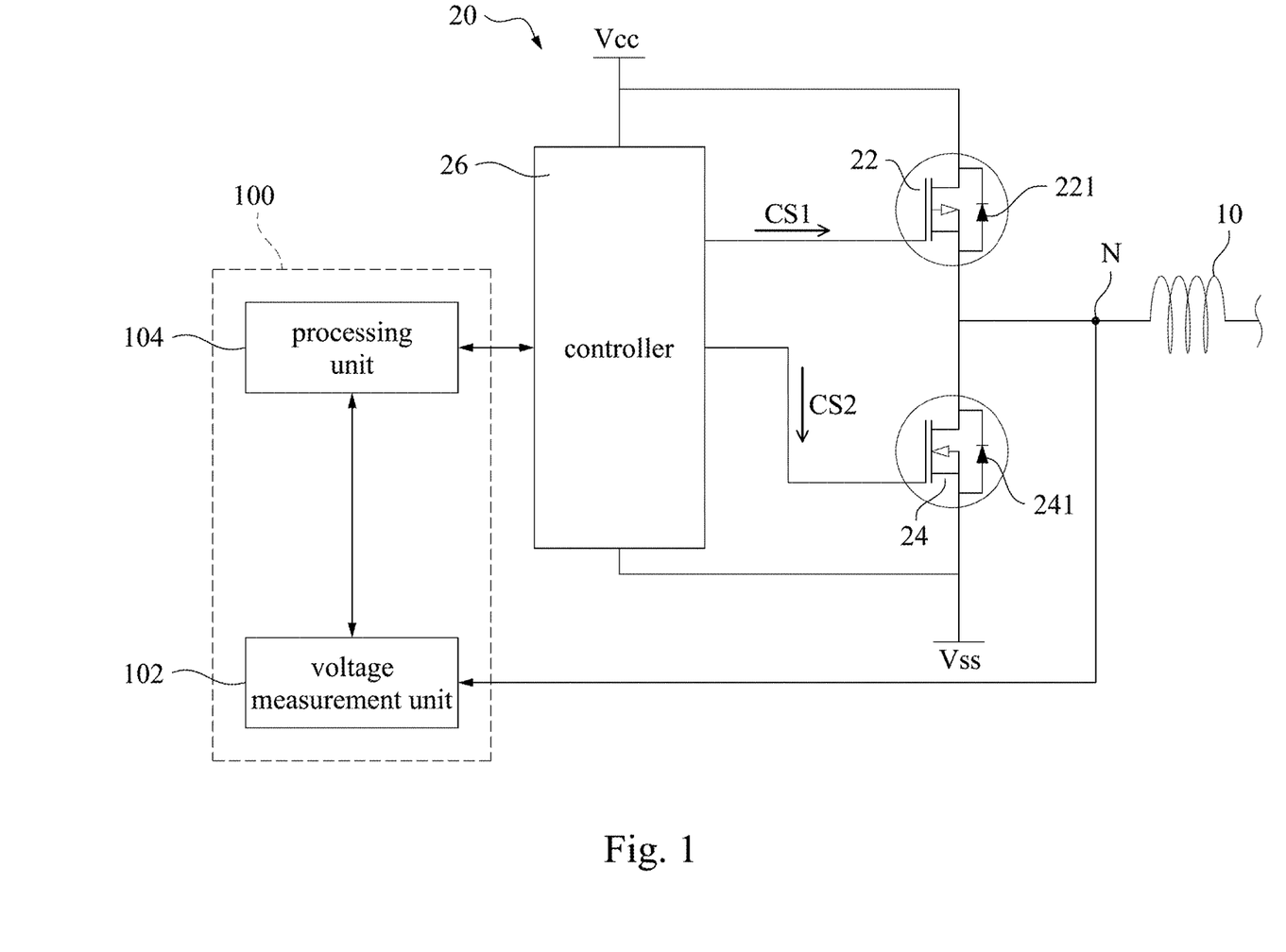
FIG. 1 is a schematic diagram of a current state determination circuit in accordance with some embodiments of the present disclosure.

Referring to FIG. 1, an embodiment of the present disclosure relates to a current state determination circuit 100. The current state determination circuit 100 is configured to determine the state of current (e.g. current 12 of FIG. 3, current 13 of FIG. 4) passing through a coil 10 of a motor (not shown) and includes a voltage measurement unit 102 and a processing unit 104.

As shown in FIG. 1, a motor driving circuit 20 is coupled to the coil 10 to drive the motor. The motor driving circuit 20 includes a high side transistor 22, a low side transistor 24 and a controller 26, wherein the high side transistor 22, the low side transistor 24 and the coil 10 of the motor are coupled to a node N. In the present embodiment, the motor is a three-phase motor. It is understood that the motor includes three coils (one of those is the coil 10 as shown in FIG. 1). However, for the purpose of simplifying description, two of the coils and two motor driving circuits corresponding thereto are omitted in FIG. 1. In structure, the voltage measurement unit 102 is coupled to the node N, and the processing unit 104 is coupled to the voltage measurement unit 102 and the controller 26.

In particular, the controller 26 is configured to generate a first control signal CS1 and a second control signal CS2. The high side transistor 22 is configured to be selectively turned on according to the voltage level of the first control signal CS1, and the low side transistor 24 is configured to be selectively turned on according to the voltage level of the second control signal CS2. The high side transistor 22 includes a first end, a second end, a first control end and a first body diode 221 parasitic between the first end and the second end. The first end is configured to receive a system high voltage Vcc, the second end is coupled to the node N, and the first control end is configured to receive the first control signal CS1. A cathode end of the first body diode 221 is coupled to the first end, and an anode end of the first body diode 221 is coupled to the second end (or the node N). The low side transistor 24 includes a third end, a fourth end, a second control end and a second body diode 241 parasitic between the third end and the fourth end. The third end is coupled to the node N, the fourth end is configured to receive a system low voltage Vss, and the second control end is configured to receive the second control signal CS2. A cathode end of the second body diode 241 is coupled to the third end (or the node N), and an anode end of the second body diode 241 is coupled to the fourth end.

In the present embodiment, the high side transistor 22 is P-type metal oxide semiconductor (PMOS), and the low side transistor 24 is N-type metal oxide semiconductor (NMOS). However, the present disclosure is not limited herein. In some embodiments, the high side transistor 22 can be implemented by NMOS, and the low side transistor 24 can be implemented by PMOS. In other embodiments, the high side transistor 22 and the low side transistor 24 can be implemented by bipolar transistor (BJT).

For better understanding the present disclosure, the operation of the current state determination circuit 100 would be described in the following paragraphs with reference made to the accompanying drawings.

Figure 2:
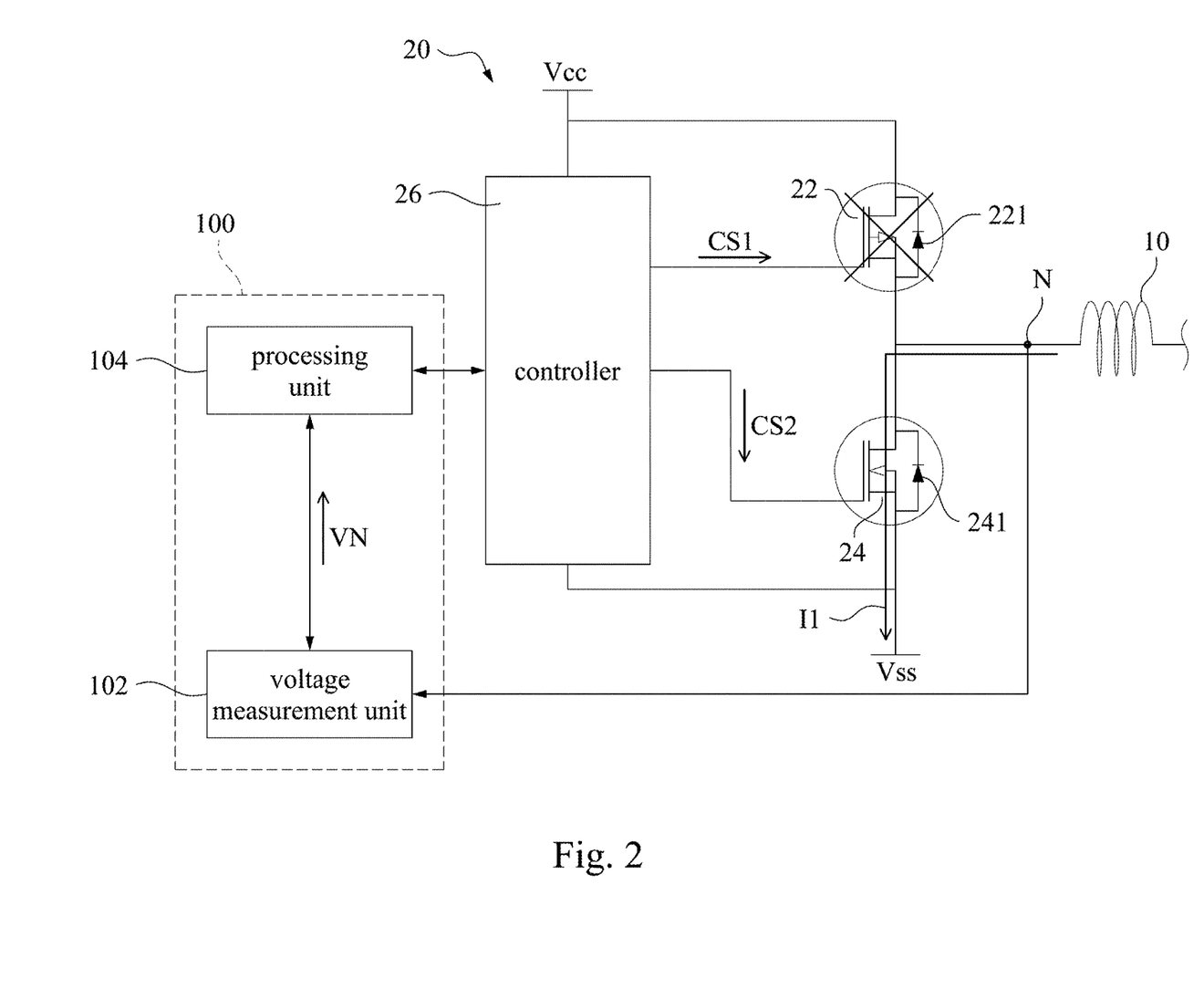
FIG. 2 is a schematic diagram of a current state determination circuit in operation in accordance with some embodiments of the present disclosure.
Figure 3:
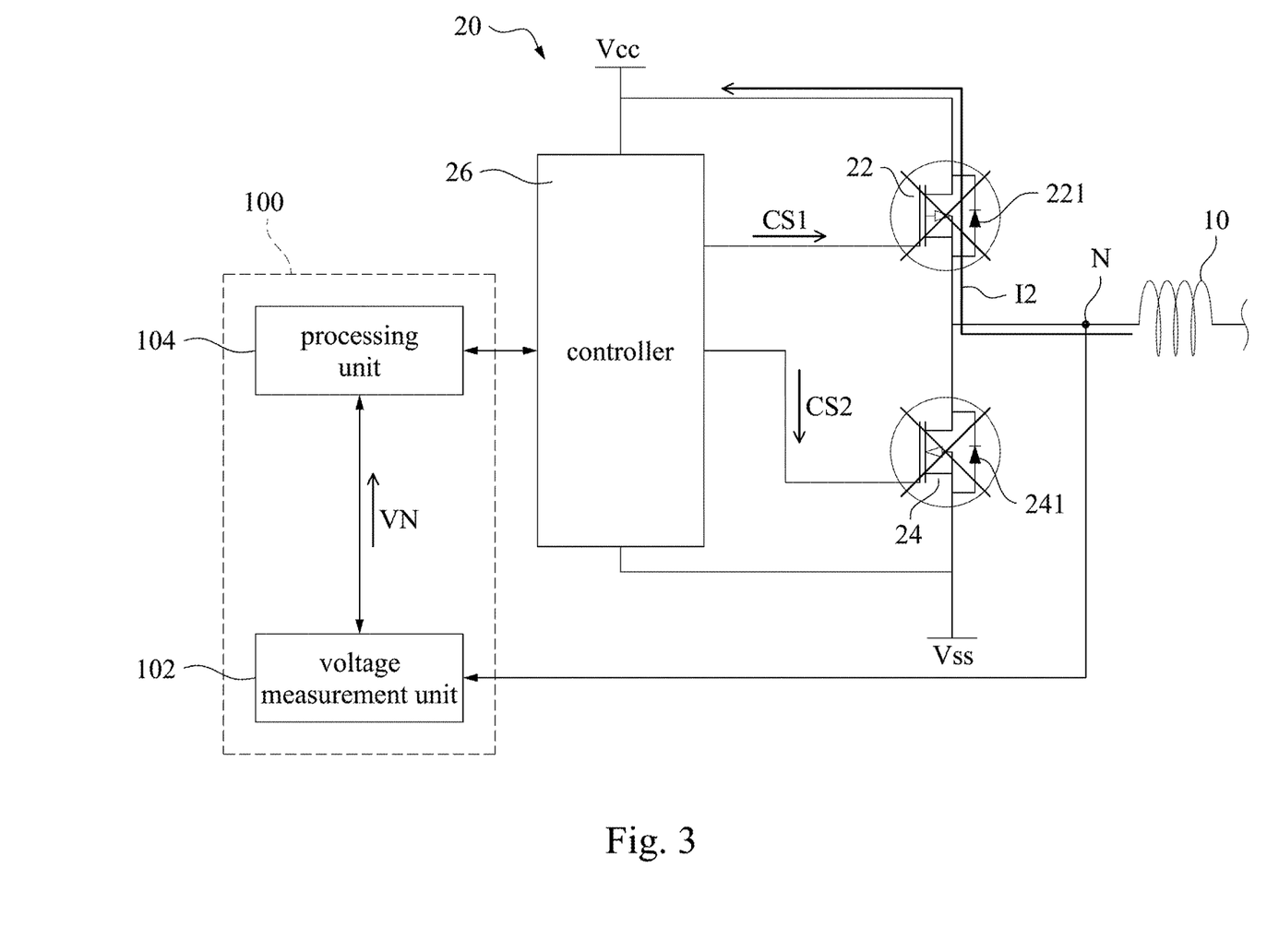
FIG. 3 is a schematic diagram of a current state determination circuit in operation in accordance with some embodiments of the present disclosure.
Figure 4:
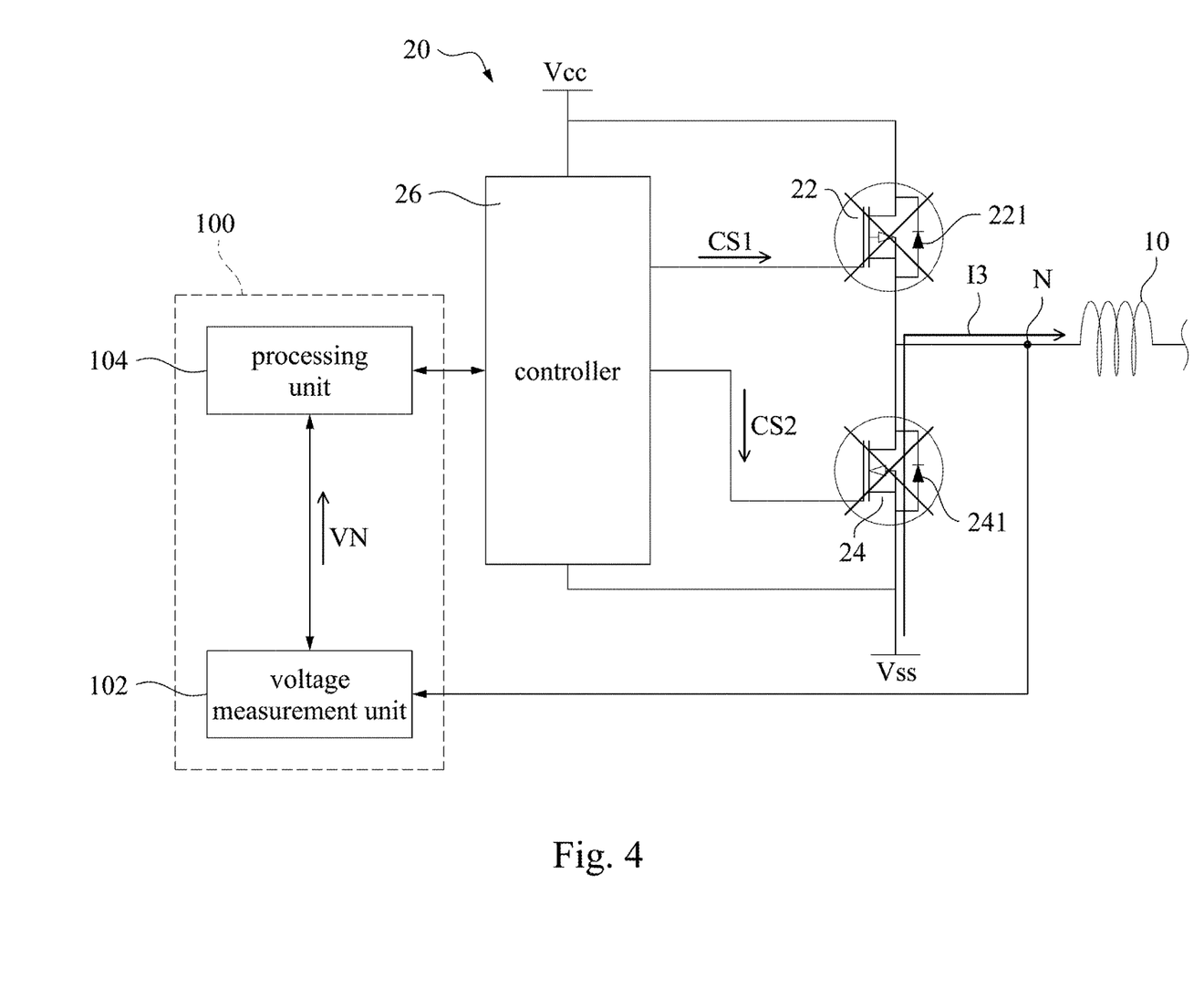
FIG. 4 is a schematic diagram of a current state determination circuit in operation in accordance with some embodiments of the present disclosure.
Figure 5:
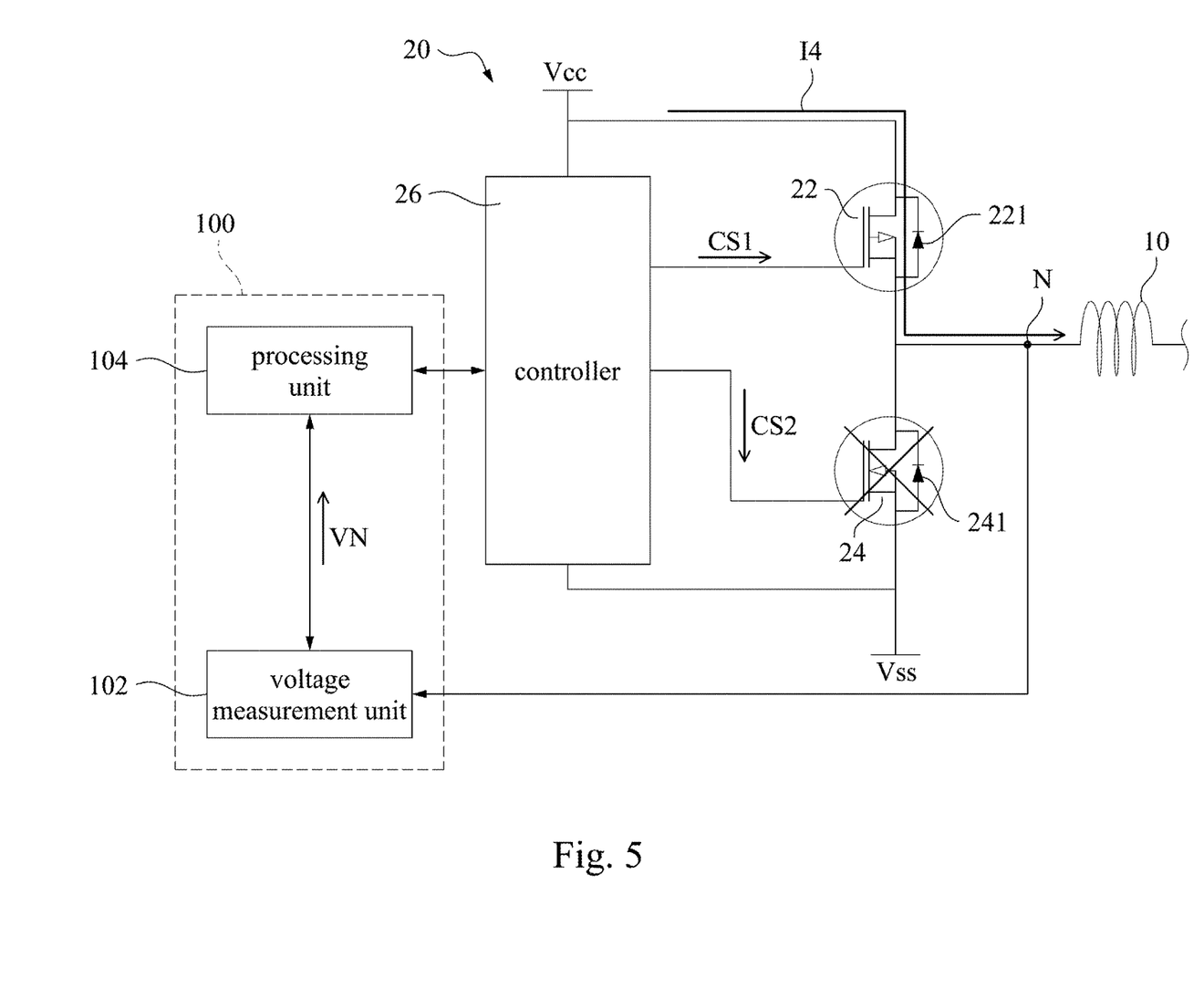
FIG. 5 is a schematic diagram of a current state determination circuit in operation in accordance with some embodiments of the present disclosure.

Referring to FIGS. 2-5, FIGS. 2-5 depict the state of each transistor in the motor driving circuit 20 when the motor is driven. In particular, the controller 26 would control the voltage level of the first control signal CS1 and the voltage level of the second control signal CS2 to alternatively turn on the high side transistor 22 (as shown in FIG. 5) and the low side transistor 24 (as shown in FIG. 2), so as to drive the motor. It is understood that when the motor is driven, there is a period (hereafter referred to as the dead zone) that the high side transistor 22 and the low side transistor 24 would both be in the cut-off state (as shown in FIGS. 3 and 4).

The voltage measurement unit 102 is configured to measure the voltage VN of the node N when the motor is driven. The processing unit 104 is configured to determine the state of the current in the coil 10 according to the change of the voltage VN when the high side transistor 22 and the low side transistor 24 are both in the cut-off state.

Figure 6:
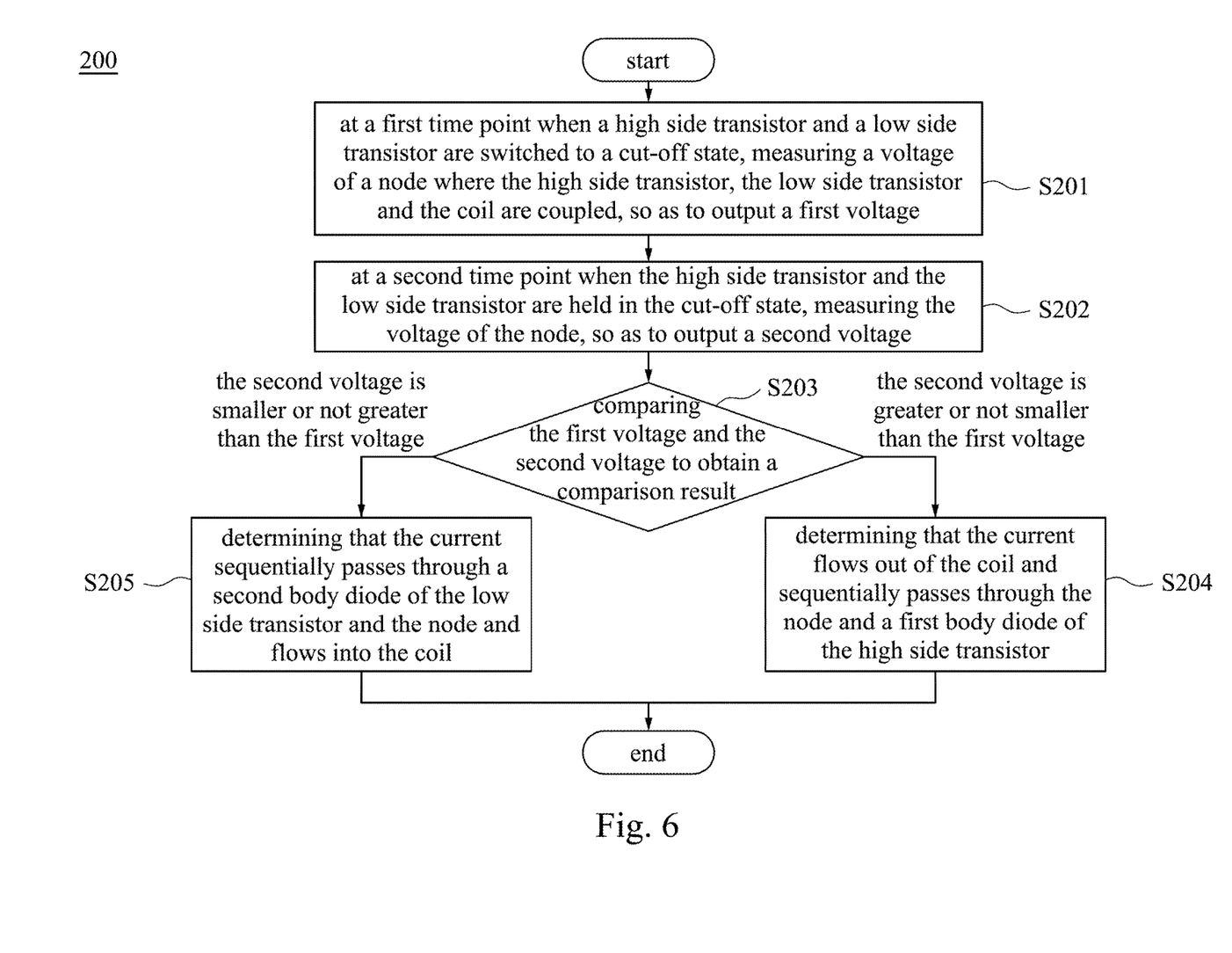
FIG. 6 is a flow diagram of a current state determination method in accordance with some embodiments of the present disclosure.

Referring to FIG. 6, FIG. 6 depicts a flow diagram of a current state determination method 200 in accordance with one embodiment of the present disclosure. The current state determination circuit 100 as shown in FIG. 1 can perform the current state determination method 200, so as to determine the state of the current in the coil 10. The current state determination method 200 includes the steps S201-S205.

In an assumption, before the step S201 is performed, the controller 26 generates the first control signal CS1 with high voltage level and the second control signal CS2 with high voltage level, so as to turn off the high side transistor 22 and turn on the low side transistor 24 (in the present embodiment, the high side transistor 22 is PMOS, and the low side transistor 24 is NMOS). In such way, as shown in FIG. 2, the current 11 flows out of the coil 10, sequentially passes through the node N and the low side transistor 24 and flows into the system low voltage Vss, so as to drive the motor. The voltage measurement unit 102 continuously measures the voltage VN of the node N when the high side transistor 22 is in the cut-off state and the low side transistor 24 is in the on state. The processing unit 104 determines that the motor driving circuit 20 is not in the dead zone according to the first control signal CS1 with high voltage level and the second control signal CS2 with high voltage level generated by the controller 26, so as to not process.

Figure 7A:
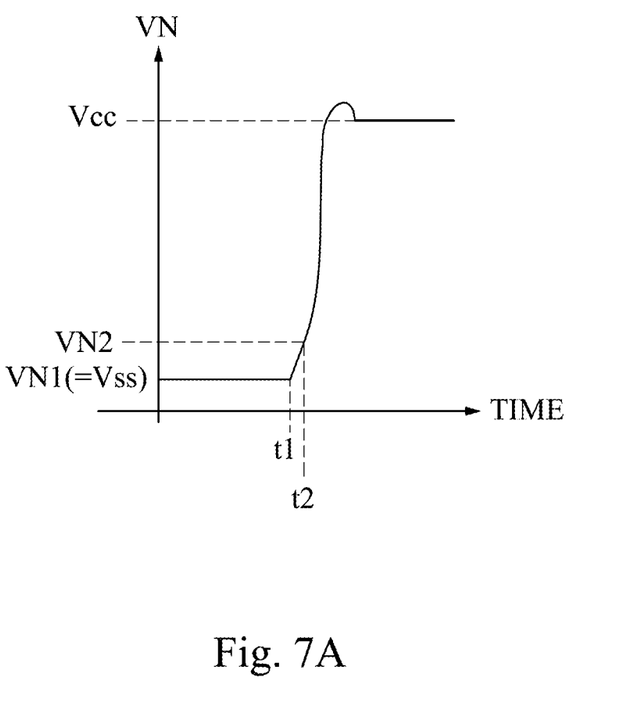
FIG. 7A is a curve diagram of the voltage change of a node where the motor driving circuit and the coil are coupled in accordance with some embodiments of the present disclosure.
Figure 7B:
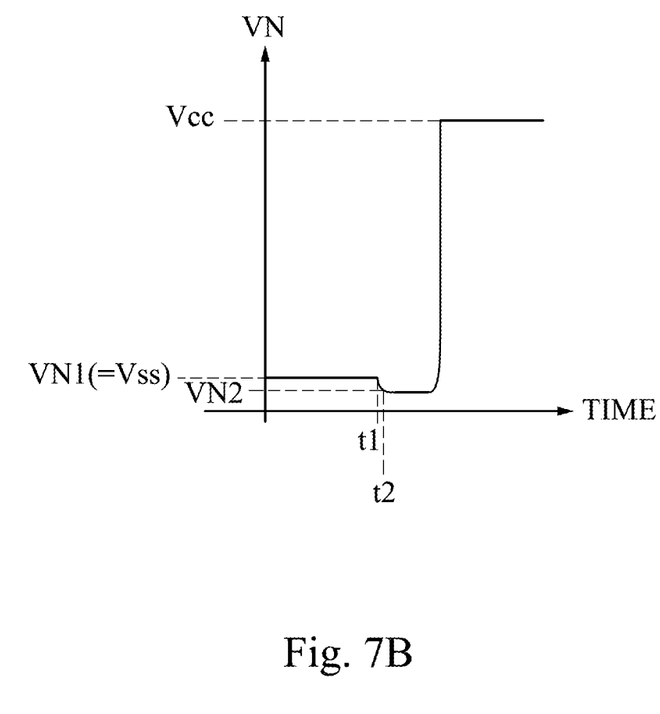
FIG. 7B is a curve diagram of the voltage change of a node where the motor driving circuit and the coil are coupled in accordance with some embodiments of the present disclosure.

The controller 26 then changes the second control signal CS2 from the high voltage level to the low voltage level, so as to switch the low side transistor 24 from the on state to the cut-off state. Accordingly, the high side transistor 22 and the low side transistor 24 are both in the cut-off state (as shown in FIGS. 3 and 4). In such way, the voltage VN of the node N would be changed from the system low voltage Vss to the system high voltage Vcc (as shown in FIGS. 7A and 7B). The current state determination circuit 100 would perform the current state determination method 200 during the period that the voltage VN of the node N is changed.

It is understood that the transient current (the current 12 as shown in FIG. 3 or the current 13 as shown in FIG. 4) would exist at the moment that the low side transistor 24 is switched from the on state to the cut-off state (at the same time, the high side transistor 22 is maintained in the cut-off state). After the low side transistor 24 is turned off entirely, the transient current would flow forward through the first body diode 221 or the second body diode 241, so that the voltage VN of the node N would be changed. For example, when the high side transistor 22 and the low side transistor 24 are maintained in the cut-off state, if the current 12 as shown in FIG. 3 (flows out of the coil 10 and sequentially passes through the node N and the first body diode 221) exists, it represents that the voltage VN of the node N is increased (because the current 12 flows forward through the first body diode 221, the voltage VN of the node N is increased from the system low voltage Vss to a voltage higher than the system high voltage Vcc). On the contrary, if the current 13 as shown in FIG. 4 (sequentially passes through the second body diode 241 and the node N and flows into the coil 10) exists, it represents that the voltage VN of the node N is decreased (because the current 13 flows forward through the second body diode 241, the voltage VN of the node N is decreased from the system low voltage Vss to a voltage lower than the system low voltage Vss).

Accordingly, in the step S201, the voltage measurement unit 102 measures the voltage VN of the node N at a first time point t1 (as shown in FIGS. 7A and 7B) that the high side transistor 22 and the low side transistor 24 are switched to the cut-off state, so as to output a first voltage VN1 (e.g. the system low voltage Vss) to the processing unit 104.

In the step S202, the voltage measurement unit 102 measures the voltage VN of the node N again at a second time point t2 (as shown in FIGS. 7A and 7B) that the high side transistor 22 and the low side transistor 24 are maintained in the cut-off state, so as to output a second voltage VN2 to the processing unit 104. In the present embodiment, the second time point t2 is later than the first time point t1.

In the step S203, the processing unit 104 receives the first voltage VN1 and the second voltage VN2, and compares the first voltage VN1 and the second voltage VN2 to obtain a comparison result.

Then, the processing unit 104 determines the state of the current in the coil 10 according to the comparison result. In particular, when the voltage VN of the node N is increased, the processing unit 104 would obtain the result that the second voltage VN2 is greater than the first voltage VN1 (as shown in FIG. 7A) in the step S203, so as to perform the step S204. In the step S204, according to the result that the second voltage VN2 is greater than the first voltage VN1, the processing unit 104 determines that the current 12 (as shown in FIG. 3) flows out of the coil 10, sequentially passes through the node N and the first body diode 221 and flows into the system high voltage Vcc. On the contrary, when the voltage VN of the node N is decreased, the processing unit 104 would obtain the result that the second voltage VN2 is not greater than the first voltage VN1 (as shown in FIG. 7B) in the step S203, so as to perform the step S205. In the step S205, according to the result that the second voltage VN2 is not greater than the first voltage VN1, the processing unit 104 determines that the current 13 (as shown in FIG. 4) flows out of the system low voltage Vss, sequentially passes through the second body diode 241 and the node N and flows into the coil 10.

The curve of the voltage higher than the system high voltage Vcc as shown in FIG. 7A and the curve of the voltage lower than the system low voltage Vss as shown in FIG. 7B are illustrated for the convenience of describing and understanding, the present disclosure would not actually measure the voltage higher than the system high voltage Vcc and the voltage lower than the system low voltage Vss. Therefore, during the period that the voltage VN of the node N is changed from the system low voltage Vss to the system high voltage Vcc (as shown in FIGS. 7A and 7B), the processing unit 104 might obtain the result that the second voltage VN2 is "not greater" than the first voltage VN1 in the step S203 and not obtain the result that the second voltage VN2 is "smaller" than the first voltage VN1.

Referring to FIG. 5, the controller 26 then changes the first control signal CS1 from the high voltage level to the low voltage level, so as to switch the high side transistor 22 from the cut-off state to the on state. In such way, as shown in FIG. 5, the current 14 can flow out of the system high voltage Vcc, sequentially passes through the high side transistor 22 and the node N and flows into the coil 10, so as to drive the motor. The voltage measurement unit 102 continuously measures the voltage VN of the node N (at this time, the voltage VN is substantially the system high voltage Vcc) when the high side transistor 22 is in the on state and the low side transistor 24 is in the cut-off state. The processing unit 104 determines that the motor driving circuit 20 is not in the dead zone according to the first control signal CS1 with low voltage level and the second control signal CS2 with low voltage level generated by the controller 26, so as to not process.

The controller 26 then changes the first control signal CS1 from the low voltage level to the high voltage level, so as to switch the high side transistor 22 from the on state to the cut-off state. Accordingly, the high side transistor 22 and the low side transistor 24 are both in the cut-off state (as shown in FIGS. 3 and 4) again. In such way, the voltage VN of the node N is changed from the system high voltage Vcc to the system low voltage Vss (not shown). The current state determination circuit 100 would perform the current state determination method 200 again during the period that the voltage VN of the node N is changed. Similar to the above description, when the voltage VN of the node N is increased, the processing unit 104 obtains the result that the second voltage VN2 is not smaller than the first voltage VN1 (e.g. the system high voltage Vcc) in the step S203 (because the present disclosure would not actually measure the voltage higher than the system high voltage Vcc), so as to perform the step S204. In the step S204, according to the result that the second voltage VN2 is not smaller than the first voltage VN1, the processing unit 104 determines that the current 12 (as shown in FIG. 3) flows out of the coil 10, sequentially passes through the node N and the first body diode 221 and flows into the system high voltage Vcc. On the contrary, when the voltage VN of the node N is decreased, the processing unit 104 obtains the result that the second voltage VN2 is smaller than the first voltage VN1 in the step S203, so as to perform the step S205. In the step S205, according to the result that the second voltage VN2 is smaller than the first voltage VN1, the processing unit 104 determines that the current 13 (as shown in FIG. 4) flows out of the system low voltage Vss, sequentially passes through the second body diode 241 and the node N and flows into the coil 10.

Figure 8:
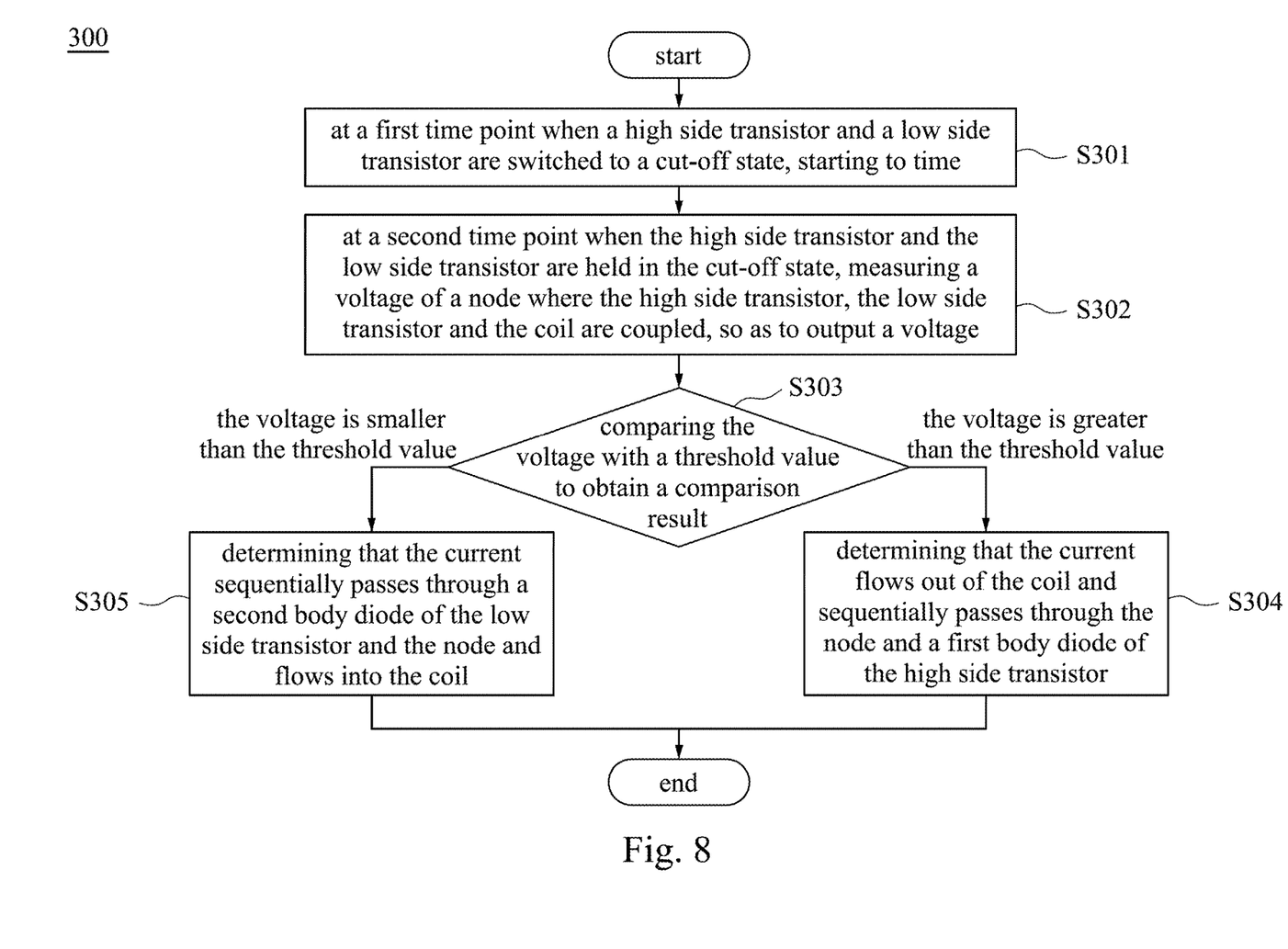
FIG. 8 is a flow diagram of another current state determination method in accordance with some embodiments of the present disclosure.

Referring to FIG. 8, FIG. 8 depicts a flow diagram of a current state determination method 300 in accordance with another embodiment of the present disclosure. The current state determination circuit 100 as shown in FIG. 1 can perform the current state determination method 300, so as to determine the state of the current in the coil 10. The current state determination method 300 includes the steps S301-

S305. The descriptions of the current state determination method 300 that are similar to those of the current state determination method 200 are omitted herein.

Figure 9A:
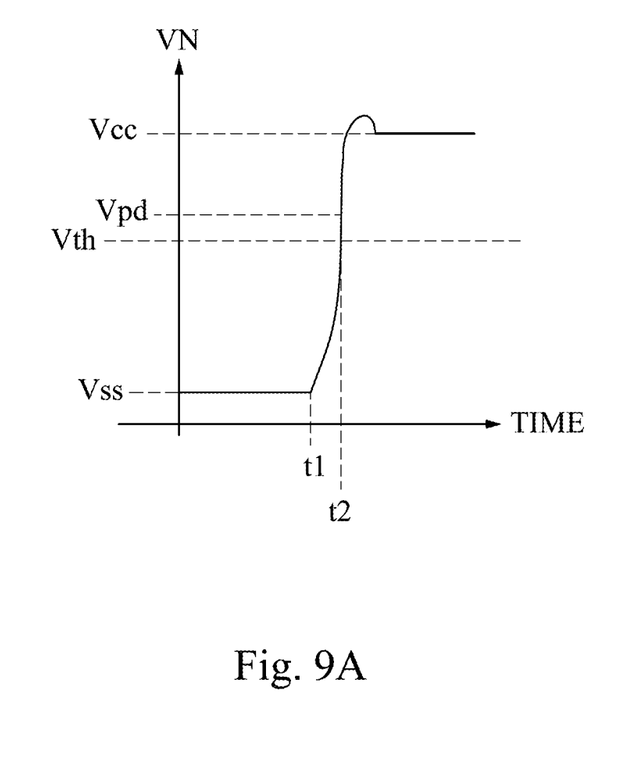
FIG. 9A is a curve diagram of the voltage change of a node where the motor driving circuit and the coil are coupled in accordance with some embodiments of the present disclosure.
Figure 9B:
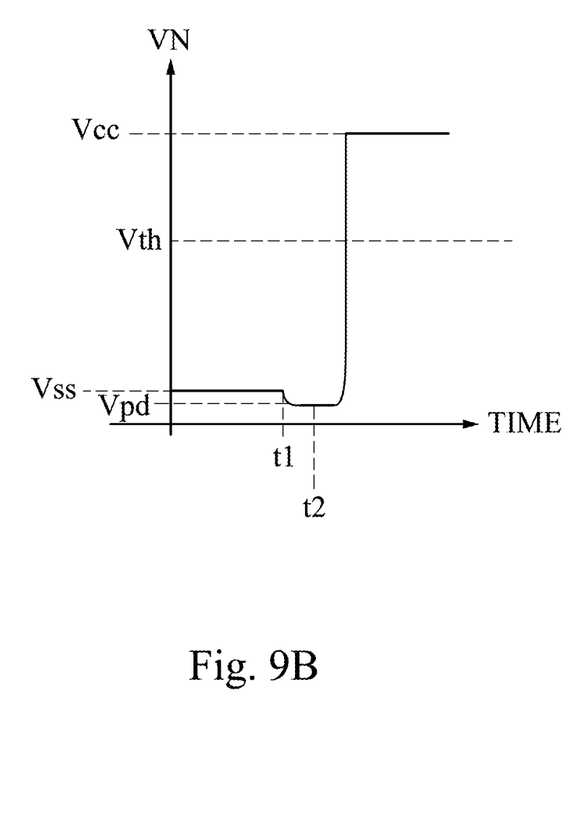
FIG. 9B is a curve diagram of the voltage change of a node where the motor driving circuit and the coil are coupled in accordance with some embodiments of the present disclosure.

The period during which the voltage VN of the node N is changed from the system low voltage Vss to the system high voltage Vcc (as shown in FIGS. 9A and 9B) is described herein. If the current 12 as shown in FIG. 3 exists when the motor driving circuit 20 enters into the dead zone, it represents that the voltage VN of the node N would be increased to the voltage higher than the system high voltage Vcc (as shown in FIG. 9A) within a predetermined time. On the contrary, if the current 13 as shown in FIG. 4 exists when the motor driving circuit 20 enters into the dead zone, it represents that the voltage VN of the node N would not be increased to the voltage higher than the system high voltage Vcc (as shown in FIG. 9B) within the predetermined time. Accordingly, the current state determination circuit 100 performs the current state determination method 300.

In the step S301, the processing unit 104 starts to time at a first time point t1 that the high side transistor 22 and the low side transistor 24 are switched to the cut-off state (as shown in FIGS. 9A and 9B). In the present embodiment, the processing unit 104 can includes a timer (not shown), or has a timing function.

In the step S302, the voltage measurement unit 102 measures the voltage VN of the node N at a second time point t2 that the high side transistor 22 and the low side transistor 24 are maintained in the cut-off state (as shown in FIGS. 9A and 9B), so as to output a voltage Vpd.

In the step S303, the processing unit 104 compares the voltage Vpd with a threshold value Vth (as shown in FIGS. 9A and 9B) to obtain a comparison result. Then, the processing unit 104 determines the state of the current in the coil 10 according to the comparison result. In the present embodiment, the threshold value Vth is between the system high voltage Vcc and the system low voltage Vss.

In particular, when the voltage VN of the node N is increased to the voltage higher than the system high voltage Vcc in the predetermined time, the processing unit 104 would obtain the result that the voltage Vpd is greater than the threshold value Vth (as shown in FIG. 9A), so as to perform the step S304. In the step S304, according to the result that the voltage Vpd is greater than the threshold value Vth, the processing unit 104 determines that the current 12 (as shown in FIG. 3) flows out of the coil 10, sequentially passes through the node N and the first body diode 221 and flows into the system high voltage Vcc. On the contrary, when the voltage VN of the node N is not increased to the voltage higher than the system high voltage Vcc in the predetermined time, the processing unit 104 would obtain the result that the voltage Vpd is smaller than the threshold value Vth (as shown in FIG. 9B), so as to perform the step S305. In the step S305, according to the result that the voltage Vpd is smaller than the threshold value Vth, the processing unit 104 determines that the current 13 (as shown in FIG. 4) flows out of the system low voltage Vss, sequentially passes through the second body diode 241 and the node N and flows into the coil 10.

The curve of the voltage higher than the system high voltage Vcc as shown in FIG. 9A and the curve of the voltage lower than the system low voltage Vss as shown in FIG. 9B are illustrated for the convenience of describing and understanding, the present disclosure would not actually measure the voltage higher than the system high voltage Vcc and the voltage lower than the system low voltage Vss.

In addition, the period during which the voltage VN of the node N is changed from the system high voltage Vcc to the system low voltage Vss (not shown) is described herein. If the current 12 as shown in FIG. 3 exists when the motor driving circuit 20 enters into the dead zone, it represents that the voltage VN of the node N would not be decreased to the voltage lower than the system low voltage Vss (not shown) within the predetermined time. Accordingly, the processing unit 104 would obtain the result that the voltage Vpd is greater than the threshold value Vth in the step S303, so as to perform the step S304. On the contrary, if the current 13 as shown in FIG. 4 exists when the motor driving circuit 20 enters into the dead zone, it represents that the voltage VN of the node N would be decreased to the voltage lower than the system low voltage Vss (not shown) within the predetermined time. Accordingly, the processing unit 104 would obtain the result that the voltage Vpd is smaller than the threshold value Vth in the step S303, so as to perform the step S305.

The current state determination circuit 100 of the present disclosure can determine the state of the current in the coil 10 when in the dead zone according to the change of the voltage VN of the node N. Since the voltage higher than the system high voltage Vcc or lower than the system low voltage Vss is not required to be measured, the current state determination circuit 100 can work without the auxiliary circuit. Also, the current state determination circuit 100 can determine the state of the current in the coil 10 when the voltage VN of the node N is between the system high voltage Vcc and the system low voltage Vss. Furthermore, the phase information of the current obtained by the current state determination circuit 100 contributes to the adjustment of the phase relationship between the current and the counter electromotive force of the motor, so that the motor can be operated at the optimal rotation speed.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A current state determination method configured to determine a state of current passing through a coil of a motor, comprising:
   at a first time point when a high side transistor and a low side transistor are switched to a cut-off state, measuring a voltage of a node where the high side transistor, the low side transistor and the coil are coupled, so as to output a first voltage;
   at a second time point when the high side transistor and the low side transistor are maintained in the cut-off state, measuring the voltage of the node, so as to output a second voltage;
   comparing the first voltage and the second voltage to obtain a comparison result; and
   determining the state of the current according to the comparison result.

2. The current state determination method of claim 1, wherein the step of determining the state of the current according to the comparison result comprises:
   when the second voltage is greater than the first voltage, determining that the current flows out of the coil and sequentially passes through the node and a first body diode of the high side transistor.

3. The current state determination method of claim 2, wherein the step of determining the state of the current according to the comparison result comprises:
when the second voltage is not greater than the first voltage, determining that the current sequentially passes through a second body diode of the low side transistor and the node and flows into the coil.

4. The current state determination method of claim 1, wherein the step of determining the state of the current according to the comparison result comprises:
when the second voltage is not smaller than the first voltage, determining that the current flows out of the coil and sequentially passes through the node and a first body diode of the high side transistor.

5. The current state determination method of claim 4, wherein the step of determining the state of the current according to the comparison result comprises:
when the second voltage is smaller than the first voltage, determining that the current sequentially passes through a second body diode of the low side transistor and the node and flows into the coil.

6. A current state determination method configured to determine a state of current passing through a coil of a motor, comprising:
at a first time point when a high side transistor and a low side transistor are switched to a cut-off state, starting to time;
at a second time point when the high side transistor and the low side transistor are maintained in the cut-off state, measuring a voltage of a node where the high side transistor, the low side transistor and the coil are coupled, so as to output a voltage value;
comparing the voltage value with a threshold value to obtain a comparison result, wherein the threshold value is between a system high voltage and a system low voltage; and
determining the state of the current according to the comparison result.

7. The current state determination method of claim 6, wherein the step of determining the state of the current according to the comparison result comprises:
when the voltage value is greater than the threshold value, determining that the current flows out of the coil and sequentially passes through the node and a first body diode of the high side transistor.

8. The current state determination method of claim 7, wherein the step of determining the state of the current according to the comparison result comprises:
when the voltage value is smaller than the threshold value, determining that the current sequentially passes through a second body diode of the low side transistor and the node and flows into the coil.

9. A current state determination circuit configured to determine a state of current passing through a coil of a motor, comprising:
a voltage measurement unit coupled to a node and configured to measure a voltage of the node when both a high side transistor and a low side transistor are in a cut-off state, wherein the high side transistor, the low side transistor and the coil are coupled to the node; and
a processing unit coupled to the voltage measurement unit and configured to determine the state of the current when the high side transistor and the low side transistor are in the cut-off state by comparing the voltage of the node when both the high side transistor and the low side transistor are in the cut-off state.

10. The current state determination circuit of claim 9, wherein the voltage measurement unit outputs a first voltage at a first time point when the high side transistor and the low side transistor are switched to the cut-off state;
the voltage measurement unit outputs a second voltage at a second time point when the high side transistor and the low side transistor are maintained in the cut-off state;
the processing unit compares the first voltage and the second voltage to obtain a comparison result and determines the state of the current according to the comparison result.

11. The current state determination circuit of claim 10, wherein when the second voltage is greater than the first voltage, the processing unit determines that the current flows out of the coil and sequentially passes through the node and a first body diode of the high side transistor.

12. The current state determination circuit of claim 11, wherein when the second voltage is not greater than the first voltage, the processing unit determines that the current sequentially passes through a second body diode of the low side transistor and the node and flows into the coil.

13. The current state determination circuit of claim 10, wherein when the second voltage is not smaller than the first voltage, the processing unit determines that the current flows out of the coil and sequentially passes through the node and a first body diode of the high side transistor.

14. The current state determination circuit of claim 13, wherein when the second voltage is smaller than the first voltage, the processing unit determines that the current sequentially passes through a second body diode of the low side transistor and the node and flows into the coil.

15. The current state determination circuit of claim 9, wherein the processing unit starts to time at a first time point when the high side transistor and the low side transistor are switched to the cut-off state;
the voltage measurement unit outputs a voltage value at a second time point when the high side transistor and the low side transistor are maintained in the cut-off state, and the processing unit compares the voltage value with a threshold value.

16. The current state determination circuit of claim 15, wherein when the voltage value is greater than the threshold value, the processing unit determines that the current flows out of the coil and sequentially passes through the node and a first body diode of the high side transistor.

17. The current state determination circuit of claim 16, wherein when the voltage value is smaller than the threshold value, the processing unit determines that the current sequentially passes through a second body diode of the low side transistor and the node and flows into the coil.

* * * * *